June 15, 1926.
A. HOLLANDER
PACKING GLAND MECHANISM
Filed Sept. 21, 1925
1,588,734
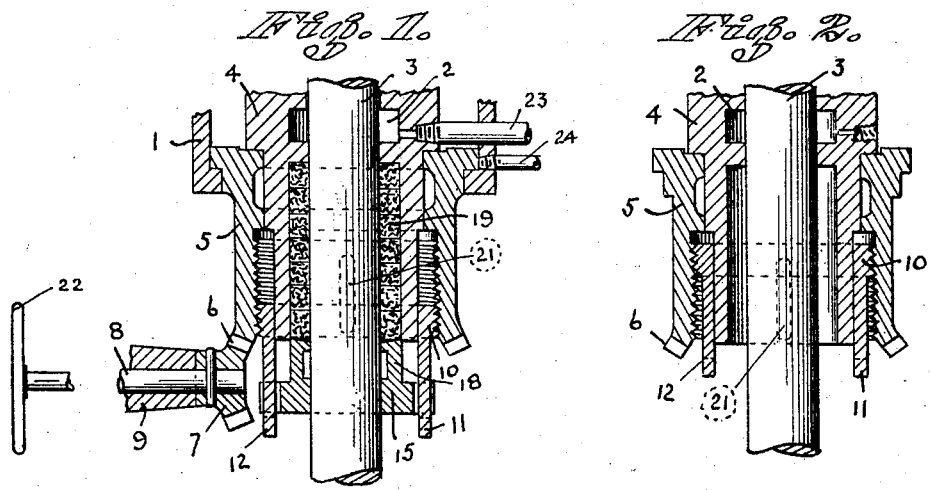
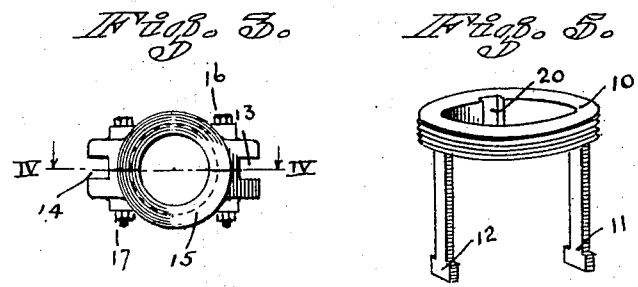
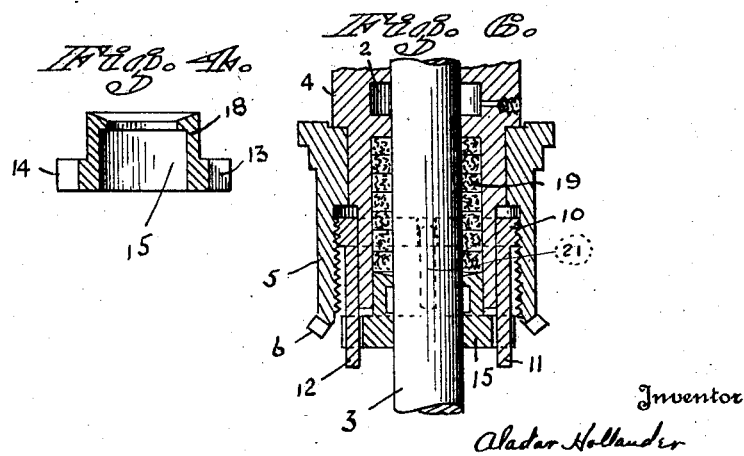
Inventor
Aladar Hollander
By George J. Stewy
Attorney Patented June 15, 1926.

1,588,734

UNITED STATES PATENT OFFICE.

ALADAR HOLLANDER, OF BERKELEY, CALIFORNIA, ASSIGNOR TO BYRON JACKSON PUMP MFG. CO., OF BERKELEY, CALIFORNIA, A CORPORATION OF CALIFORNIA.

PACKING-GLAND MECHANISM.

Application filed September 21, 1925. Serial No. 57,535.

My invention has for its object mechanism adapted to facilitate the operation, adjustment and re-packing of gland structures about shafts and the like and is particularly applicable to high pressure pumps and apparatus employing pressure fluid compartments through the walls of which it is desired to operate a shaft without leakage from compartments of high pressure to adjacent spaces of lower pressure.

The gland of my invention is particularly adapted to high pressure oil pumps wherein the leakage of oil is usually attended with fire risk.

Where oil under very high pressure escapes through minute openings as around shafting and through packing glands due to the sudden release of pressure, the oil at once vaporizes and constitutes a great fire risk.

Where the temperature is sufficiently high, or where a spark is accidentally caused as by the handling of tools, electric apparatus or the like, the issuing oil vapor will burst into flame. It is therefore necessary in operating high temperature or high pressure oil pumps, to employ special instrumentalities directed to prevent such leakage and therefore reduce the fire risk to a minimum.

The packing gland mechanism of my invention is particularly adapted to such use.

In employing ordinary conventional packing glands, great difficulty is experienced in properly adjusting the gland and in replacing or repairing the packing around the shaft. These difficulties I have overcome in the mechanism of my invention by introducing accessory mechanism whereby the gland may be most readily adjusted against packing to any desired degree, or entirely stripped from the shaft to facilitate the introduction of new packing or repair the old packing and the gland re-adjusted with a minimum of effort and most satisfactory results.

By referring to the accompanying drawing my invention will be made clear.

Fig. 1 illustrates my packing gland mechanism assembled around a conventional shaft and adapted to seal the shaft between two compartments of different pressure. This figure shows the gland ready to operate to compress the packing.

Fig. 2 is a fragmentary showing of the parts of Fig. 1 with the gland and packing entirely removed with the parts ready to be re-packed.

Fig. 3 is a plan view of the gland of Fig. 1.

Fig. 4 is a cross section through Fig. 3, on the line IV—IV and at right angles thereto.

Fig. 5 is a detailed perspective of the adjusting ring.

Fig. 6 is similar to Fig. 1 except that the packing is shown fully compressed.

Throughout the figures similar numerals refer to identical parts.

The numeral 1 illustrates a portion of the casing of any conventional apparatus employing a pressure compartment at 2, as for example the casing of a turbine or high pressure oil pump such as that illustrated in my companion application Serial No. 57,534, filed Sept. 21, 1925, to which reference is herein made.

A shaft is shown at 3, and a rigid supporting member extending from the aforesaid casing is shown at 4.

At 5 is a rotatable collar having gear teeth 6, meshing with a pinion 7 carried upon the operating stem 8 in any conventional bearing 9.

The collar 5 is internally threaded and engaging in said threads is the adjusting ring 10 having arms at 11, 12 respectively, which arms are provided with T-shaped ends adapted to engage in the slots 13, 14 respectively of the gland 15.

This gland is split and provided with connecting bolts 16, 17 so that it may be entirely removed from around the shaft 3 by disconnecting the said bolts.

The gland is provided with a ring portion 18 adapted to telescope within the member 4 and compress the packing 19 to effect closure around the shaft and prevent leakage as from the pressure compartment 2 outward along the shaft.

The adjusting ring 10 is provided with a keyway 20 which slides upon the spline 21, fixed in the member 4, thus allowing the adjusting ring to move freely longitudinally on the member 4, but preventing its rotation with respect thereto.

The gland 15 is prevented from rotating by the arms 11 and 12 while the shaft 3 is allowed to freely rotate within the packing 19.

The hand wheel 22 is adapted to rotate the shaft 8, thus enabling the collar 5 to be operated from a remote and convenient point.

The operation is as follows:

Assuming that it is desired to repack the parts as shown in Fig. 6 the hand wheel 22 of Fig. 1 is rotated until the adjusting ring 10 is in the position of the parts of Fig. 1.

The gland 15 is now fully exposed outside of the member 4.

The bolts 16 and 17 are removed and the two halves of the gland are then removed.

After the gland halves are removed the hand wheel 22 is rotated in the opposite direction, advancing the adjusting ring 10 back into the sleeve 5 in the position of the parts shown in Fig. 2. This exposes the space around the shaft to enable the operator to readily get at the gland and packing 19.

The operator now removes this packing and replaces it with new packing. The two halves of the gland 15 are then assembled with the bolts 16 and 17 and the hand wheel 22 again rotated in opposite direction, causing the gland 15 to compress the packing 19 to the desired degree.

From time to time the gland will need adjusting and this adjustment is accomplished with the rotation of the hand wheel 22 compressing the packing 19 to always maintain a tight closure against the shaft 3 with a minimum amount of friction.

Reference is herein made to my co-pending application, Serial No. 106,341, filed May 3rd, 1926, wherein other packing gland mechanism of a similar nature is disclosed and claimed.

I claim:

1. Packing gland mechanism comprising a casing having a bore for packing and a gland telescoping in said bore and adapted to compress said packing in said bore, an adjustable ring longitudinally movable with respect to said casing and having connection with said gland to force the said movement of the gland and instrumentalities to actuate said ring by remote hand control, and including a hand wheel and gear and rotatable sleeve concentric with said bore said sleeve having internal threads engaging threads on said ring.

2. Packing gland mechanism comprising a casing member of cylindrical form and bore, a two part gland telescoping in said bore and adapted to compress packing in said bore, an adjustable ring longitudinally slidable on said member splined against rotation, connecting arms between said ring and said gland and means adapted to force the movement of said ring.

3. Packing gland mechanism comprising a casing member of cylindrical form and bore, a two part gland telescoping in said bore and adapted to compress packing in said bore, an adjustable ring longitudinally slidable on said member splined against rotation, connecting arms between said ring and said gland and means adapted to force the movement of said ring and comprising a sleeve in thread engagement with said ring and hand operable instrumentalities to rotate the sleeve and slide the ring.

4. Packing gland mechanism as set forth in claim 2 wherein the ring is externally threaded and the sleeve internally threaded and rotation of the sleeve forces the ring to slide into collapsed position between the member and the sleeve.

ALADAR HOLLANDER.